Feb. 27, 1973  L. E. McCULLOUGH ET AL  3,718,930
BORING BIT LOCATOR

Filed July 6, 1970  3 Sheets-Sheet 1

LESTER E. McCULLOUGH,
DUANE A. LADINE,
INVENTORS

BY Beehler & Arant

ATTORNEYS

LESTER E. McCULLOUGH
DUANE A. LADINE
INVENTORS

BY Beehler & Arant
ATTORNEYS

LESTER E. McCULLOUGH
DUANE A. LADINE
INVENTORS

United States Patent Office 3,718,930
Patented Feb. 27, 1973

3,718,930
BORING BIT LOCATOR
Lester E. McCullough, Glendale, and Duane A. Ladine, Northridge, Calif., assignors to The Goldak Company, Inc., Glendale, Calif.
Filed July 6, 1970, Ser. No. 52,474
Int. Cl. G01s 5/02
U.S. Cl. 343—112 R          3 Claims

ABSTRACT OF THE DISCLOSURE

A bore pipe is rotatably driven to drive a horizontal bore below the earth's surface, and radio energy transmitted from a locator device is monitored on the ground surface by means of a radio receiver tuned to the same frequency. A boring bit locator is rigidly attached between the bore pipe and a boring bit, and carries a small battery powered transmitter. A single operator working on the surface of the ground with a single radio receiver is able to monitor the progress and location of the boring bit.

The boring bit locator has a water passageway which permits a stream of water delivered through the bore pipe to flow to the boring bit for the purpose of washing cuttings back through the hole.

The method of determining the position of the locator device takes advantage of the radiation pattern of the transmitter, which is so arranged as to be susceptible to being precisely measured.

BACKGROUND OF THE INVENTION

In many construction jobs it is necessary to install a gas pipe, a water line, a power cable or a telephone cable, in a tunnel of small diameter which extends horizontally below the surface of the earth. This type of construction is widely used, for example, under streets and railroad right-of-ways. A typical tunnel diameter is a few inches, and typical tunnel depth is eight feet or less. It is desirable for various reasons to be able to guide the boring of the tunnel or hole as it takes place, or to be able to monitor the location of the boring bit, or both.

So far as we are aware no electronic device, or other type of device, has hitherto been developed which provides a satisfactory solution to this problem, as applied to small bore holes of a few inches diameter. These small bore holes are to be significantly distinguished from larger tunnels having a diameter of several feet or more, because in the drilling of larger tunnels the far greater space available inside the tunnel makes it possible to use sophisticated systems for position measurement and for guidance purposes, as well as sophisticated equipment for drilling the tunnel. However, in the drilling of a small bore hole for utility lines and the like, the available space is greatly limited by the small size of the bore hole, which imposes hitherto insurmountable limitations on the use of guidance equipment inside the bore hole.

According to our invention a battery powered radio transmitter is positioned within a boring bit locator, and the locator is rigidly attached between the boring bit and the bore pipe which drives the bit. Lest it appear that the problem was to simple to require either effort or ingenuity in its solution, it must also be pointed out that there were many practical obstacles which would appear to prevent a system of this type from being successful.

Among the apparent difficulties were (1) the available space seemed barely sufficient for transporting a self-powered transmitter; (2) continuous rotation of the bore pipe necessitated for driving the boring bit would tend to disrupt and damage the electronic system and thus make its operation unreliable; (3) the wear and tear of boring operations would tend to require frequent replacement of parts and thus render the equipment uneconomical; (4) the length of the bore pipe, if the bore pipe were a part of the transmitter's antenna system, would vary the radiation pattern and hence destroy the accuracy of the system; (5) if the bore pipe were not part of the radiation system of the device, then it would appear impossible to develop sufficient energy within the available space limitation to pierce the surroundings, including metallic pipe structure, water flowing through the tunnel, and wet ground, with sufficient energy to be reliably received at the ground surface; and (6) assuming that sufficient energy could be transmitted to the surface of the ground to be reliably received, it was not known whether the radiation pattern might be distorted in an unpredictable manner, and even if the radiation pattern were not distorted it was not known whether precise position measurements could be made.

According to the present invention satisfactory solutions have been found to the various difficult problems which were presented, and the invention has now provided a reliable device for use below ground as well as a novel and efficient method for use by an operator on the surface of the ground for detecting the underground device and determining its location.

DRAWING SUMMARY

MECHANICAL CONSTRUCTION

Figure 1:
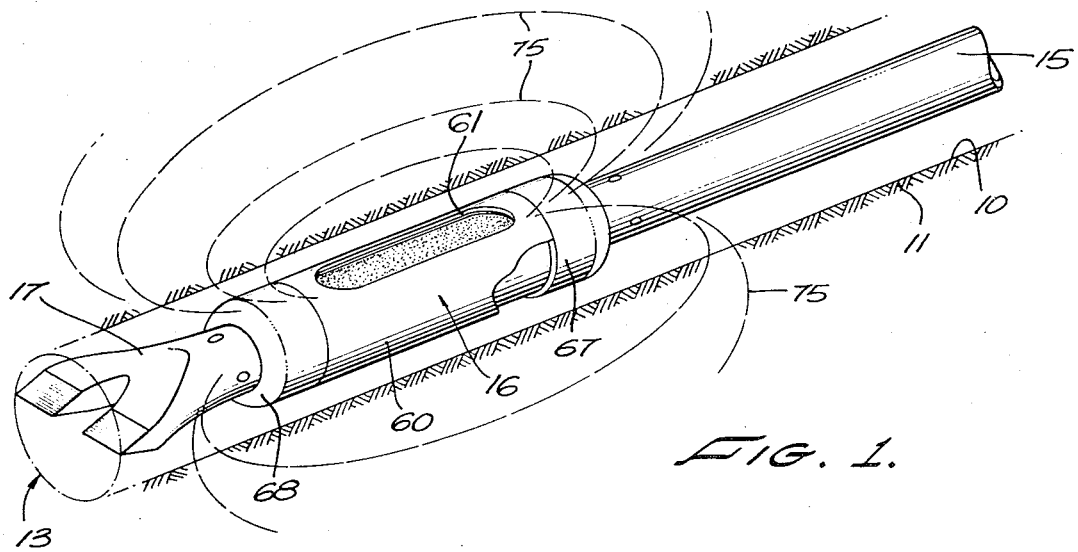
FIG. 1 is a perspective view showing a boring bit locator of the present invention when in use.
Figure 10:
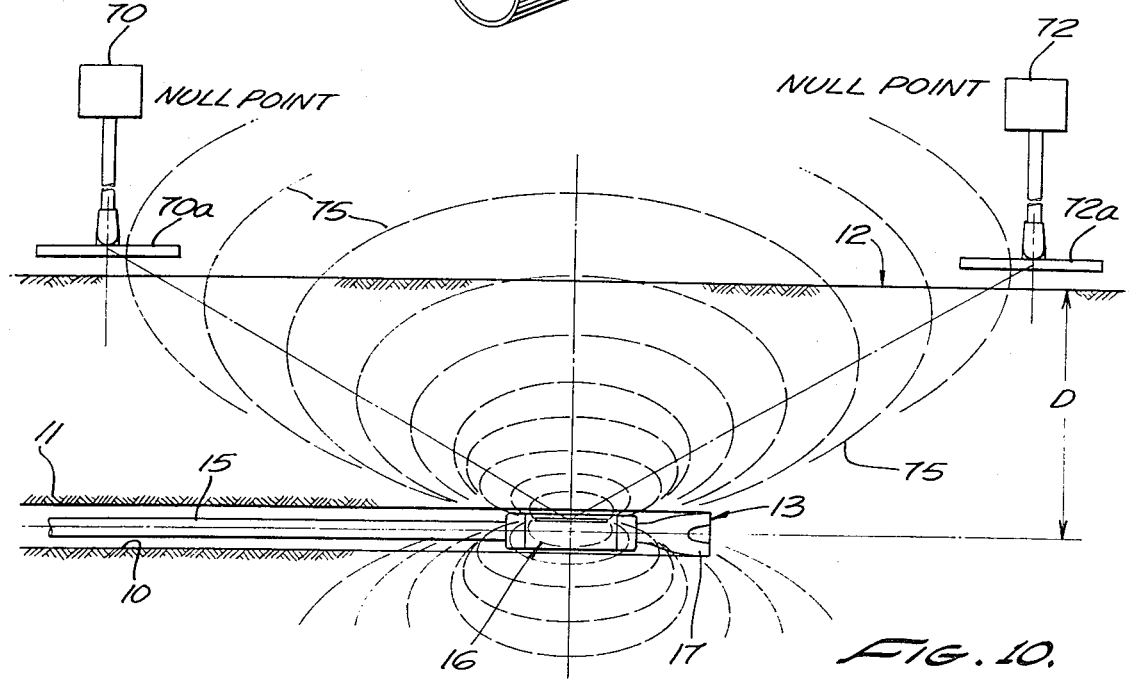
FIG. 10 illustrates schematically the inductive field radiation pattern of the device, and indicates the triangulation method used in locating its position.

Referring to FIGS. 1 and 10, the present invention relates to drilling a horizontal bore 10 in the earth 11 at a considerable distance below the earth's surface 12. The apparatus includes, generally, a bore pipe 15, a boring bit locator 16, and a boring bit 17. The bore pipe 15 is rotatably driven, so that the boring bit 17 progressively cuts the end face 13 of the bore 10.

During the boring operation a stream of water, not shown, is preferably used to facilitate the cutting action of the boring bit. The water stream is supplied through the bore pipe 15 and passes through the boring bit locator 16 into the interior of the boring bit 17, and is then released near the forward end of the boring bit so as to loosen the cuttings and continuously wash them toward the rear of the bore hole.

The boring bit locator 16 includes as its main housing a generally cylindrical body 20, which has various openings formed therein to accommodate the accompanying parts of the apparatus. A removable battery 40 is received in one side of the housing and a transmitter 50 is received in the opposite side, and while the housing is metal both the battery and the transmitter and accompanying circuitry are completely insulated from the housing so that the housing does not form any part of the electrical circuit.

The housing 20 at its respective ends has threaded end openings for receiving the bore pipe 15 and the boring bit 17, and these openings are preferably identical so that the boring bit locator 16 may if desired be reversed in its position relative to the bore pipe 15. However, in the present drawings a particular end of the housing 20 is connected to the bore pipe 15, and will hence be described in that relationship.

Figure 4:
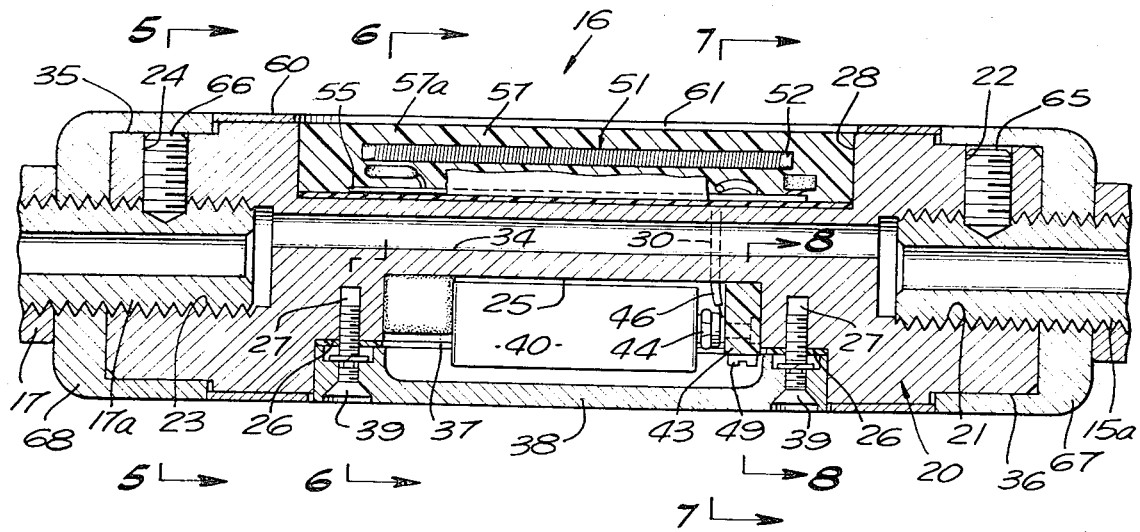
FIG. 4 is a longitudinal cross-sectional view taken on the line 4—4 of FIG. 2.
Figure 5:
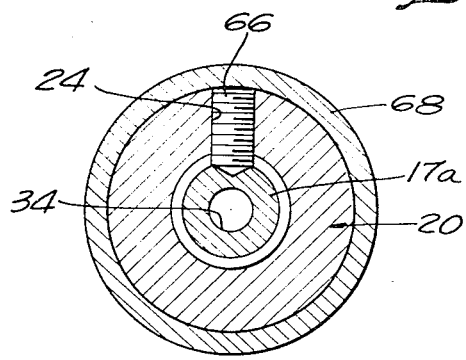
FIG. 5 is a transverse cross-sectional view taken on the line 5—5 of FIG. 4.

Thus, at its rearward end as best seen in FIG. 4, the housing 20 has a threaded end opening 21 for receiving the bore pipe 15. An accompanying threaded set screw hole 22 communicates with the end opening 21 at one point. At its forward end a threaded end opening 23 is provided for attachment of the boring bit 17 and a threaded set screw hole 24 communicates with the end opening 23 at one point. Both of the end openings 21, 23 are concentric to the longitudinal axis of housing 20.

Figure 3:
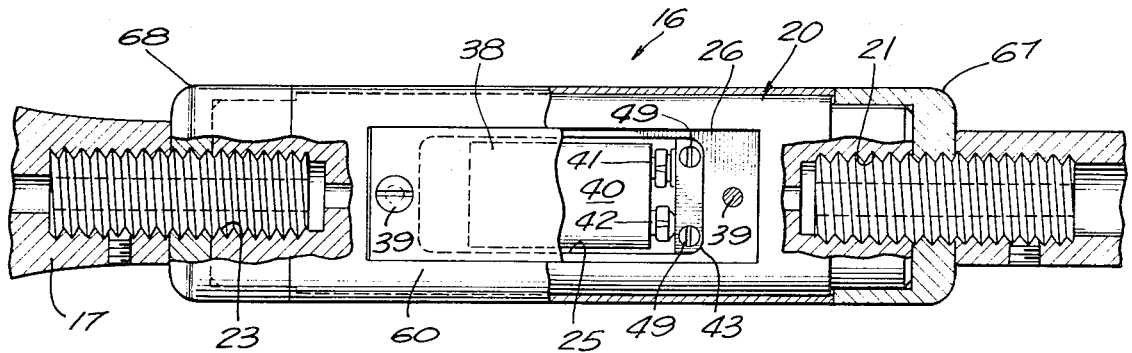
FIG. 3 is a bottom plan view of the device of FIG. 1, shown partially in cross-section.

At its longitudinal center the housing 20 has two outwardly opening compartments which are located on opposite lateral sides of the housing. A battery compartment 25 is seen in FIG. 3, and also appears at the bottom of FIG. 4 and at the top of FIG. 9. A pair of recesses 26 appear on respective end of the compartment 25, and a screw hole 27 is located in each recess 26.

Figure 2:
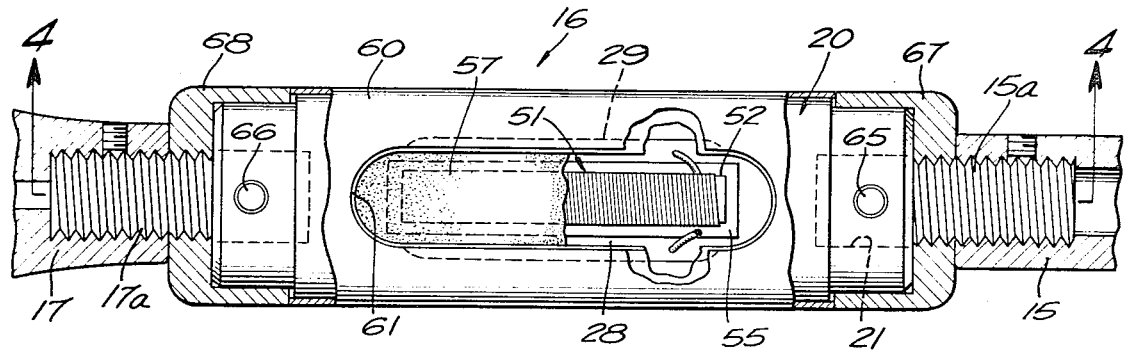
FIG. 2 is a top plan view of the device as it appears in FIG. 1, and shown partially in cross-section.
Figure 6:
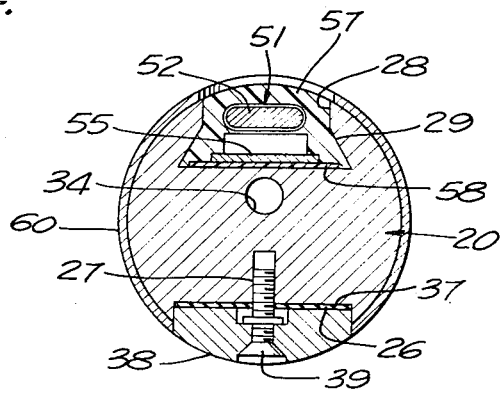
FIG. 6 is a transverse cross-sectional view taken on the line 6—6 of FIG. 4.
Figure 7:
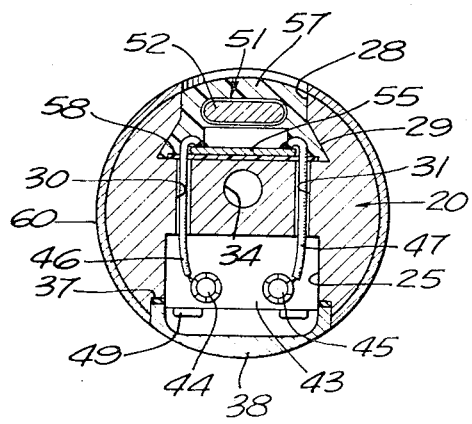
FIG. 7 is a transverse cross-sectional view taken on the line 7—7 of FIG. 4.

A transmitter compartment 28 is seen in FIG. 2 and also appears at the top of FIG. 4. The bottom part of the transmitter compartment 28, formed deeper in the interior of housing member 20, is widened so as to provide outwardly diverging lower side wall portions 29. This configuration of the transmitter compartment is shown in FIGS. 6 and 7.

A pair of jumper wire passageways 30, 31 extend laterally through the housing 20, communicating between the bottom of the battery compartment 25 and the transmitter compartment 28. The location of these passageways is shown in FIG. 7, and it will be seen that they are spaced apart in parallel relationship and located some distance away from the longitudinal axis or radial center of the housing 20.

A water passageway 34 is also formed in the housing 20 communicating between the end openings 21 and 23. The purpose of the water passageway 34 is to convey a stream of water from the bore pipe 15 to the boring bit 17, as previously described. As shown in FIGS. 4, 6 and 7 the passageway 34 is located near the longitudinal axis of the housing 20 displaced slightly therefrom. The reason for the eccentric positioning of passageway 34 is that the battery compartment 25 is considerably deeper than the transmitter compartment 28, and it is desired to avoid any flow of water into either of these compartments, hence the passageway 34 is cut through the available material without communicating with either of those compartments. As best shown in FIG. 4 the diameter of the water passageway 34 is only about one-third the diameter of the end openings 21, 23, hence the water passageway may be formed after the end openings have been drilled in the housing member 20 simply by drilling an eccentrically located hole extending from the face of one of the end openings to the face of other.

Figure 8:
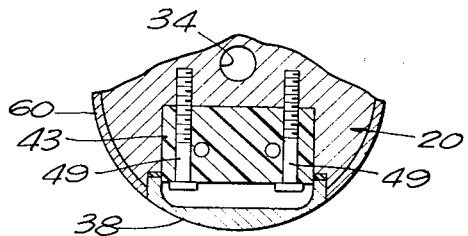
FIG. 8 is a fragmentary cross-sectional view taken on the line 8—8 of FIG. 4.
Figure 9:
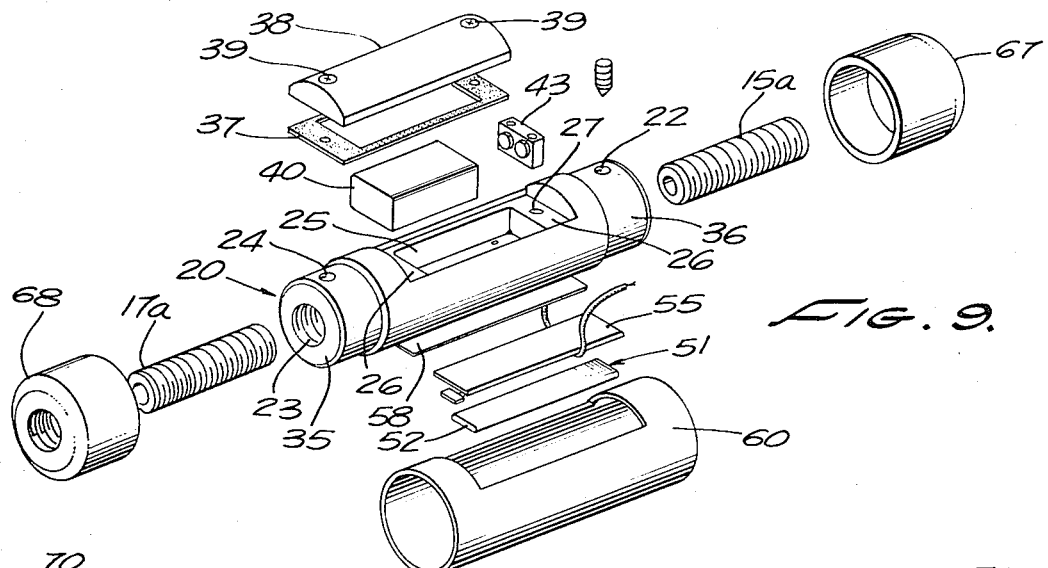
FIG. 9 is an exploded perspective view of the boring bit locator of the present invention.

The battery 40 is of a generally rectangular configuration and is removably received in the battery compartment 25. The battery 40 at one end is equipped with a pair of snap fastener elements 41, 42 (not specifically shown), one being a male connector and the other a female connector. A terminal block 43 is located in one end of the battery compartment, immediately adjacent to the passageways 30, 31. Terminal block 43 is best seen in FIGS. 9, 7 and 8. The terminal block 43 carries a female snap fastener element 44 and a male snap fastener element 45, these fasterners being engaged by the corresponding snap fasteners on the batttery 40. Jumper wires 46, 47 extend from the fasteners 44, 45, respectively, through the pasages 30, 31, respectively, to the interior of the transmitter compartment 28, where they are connected to the transmitter circuit. A rubber spacer block 48 is located in the other end of battery compartment 40, away from the terminal block 43, so that battery 40 is continuously urged toward the terminal block.

A rubber gasket 37 (see FIG. 9) has a generally rectangular configuration and is adapted to fit around the battery compartment 25. A battery cover 38 fits over the gasket 37 and is held in place by a pair of captive screws 39 which engage the screw holes 27 (see FIG. 4). The purpose of gasket 37 is to prevent water from entering the battery compartment.

As shown in FIG. 8 the terminal block 43 is held firmly fastened to the housing 20 by means of a pair of screws 49. Thus the battery 40 may be conveniently removed by detaching it from the snap fasteners, and may then be replaced by an other like battery and the internal wiring remains fixed.

Figure 11:
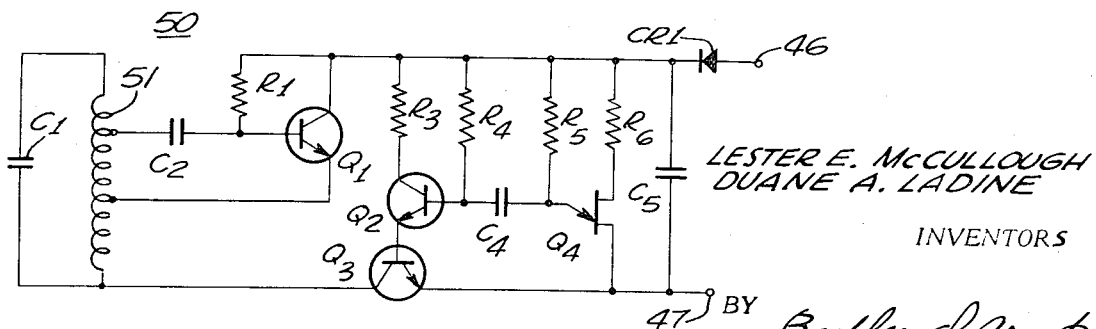
FIG. 11 is a schematic circuit diagram of the transmitter electric circuit.

The transmitter circuit 50 is contained inside the transmitter compartment 28, and its electrical circuit is shown schematically in FIG. 11. In FIG. 11 it will be seen that the jumper wires 46, 47 provide the input terminals for the transmitter circuit. A coil 51 schematically represents the antenna portion of the transmitter circuit.

As best seen in FIG. 4 the antenna includes an elongated ferrite rod 52 on which the coil 51 is wound. The ferrite rod 52 occupies the upper portion of the transmitter compartment 28 and extends a substantial part of the length of the housing 20, in parallel relationship with the longitudinal axis of the housing. The various other elements of the circuit 50 include transistors, resistors, capacitors, and a semi-conductor diode, which are arranged in a conventional manner to constitute a transmitter circuit, and which need not be described here in detail. Suffice to say that all of these elements are physically mounted on a circuit board 55 and interconnected by means of interconnections printed on the circuit board. The circuit board 55 is of about the same size and configuration as the ferrite rod 52 so that these two items may be placed in parallel relationship but spaced from each other and thus substantially fill the transmitter compartment 28. (See FIG. 6.) The electrical connections between the circuit board 55 and the antenna are shown in FIG. 11, but their precise mechanical form is not shown in the other drawing figures.

The transmitter compartment 28 is filled with an electrical insulating type of sealing material, generally referred to as potting compound and identified by the numeral 57. A rubber sheet 58 is first placed on the flat bottom of the transmitter compartment 28 (see FIG. 6), to protect the soldered connections on circuit board 55 from being shorted by the metal body 20. Electrical connections are made from the antenna coil 51 to the circuit board, and spacers are used to hold the antenna coil in a fixed position relative to the circuit board, hence the transmitter as a whole constitutes a module which is inserted into the compartment on top of the sheet 58. The jumper wires 46, 47 are then soldered to the board (see FIG. 7). Then the potting compound is poured into the compartment so as to fully cover the antenna. It will be noted in FIG. 4 that the ends of the ferrite rod 52 are spaced well away from and hence thoroughly insulated from the end walls of the transmitter compartment 28.

The housing 20 is formed from a solid piece of non-magnetic material, and while a rigid plastic material may be used it is preferred to make the housing of aluminum and anodize the surfaces. A cylindrical sleeve 60 fits over the outer surface of housing 20 to protect the housing against wear. Sleeve 60 is preferably made of hardened steel. The sleeve 60 has one window 61 which leaves the transmitter compartment and the potting compound 57 thereof fully exposed to the outside, and another window which leaves battery cover 38 exposed. End caps 67 and 68 are attached to respective ends of the housing 20, and the sleeve 60 is retained in place between the end caps. As best seen in FIG. 9 the ends of the housing are cut down at 35, 36 so as to receive the end caps thereon.

A pipe adapter 15a is inserted in the pipe opening 21 and is secured by a set screw 65 passing through the set screw hole 22. End cap 67 is threaded over the pipe adapter 15a and makes a sliding fit over the end cap recess 36 of housing 20, thus concealing the set screw 65 (see FIG. 4). The other end of the pipe adapter 15a is then screwed into the bore pipe 15, thus firmly connecting the boring bit locator to the bore pipe.

In similar manner a pipe adapter 17a is screwed into the boring bit opening 23 and is secured by a set screw 66 inserted through the set screw hole 24. End cap 68 is screwed over the pipe adapter 17a and makes a sliding fit over the recess 35 so as to cover the set screw 66. The other end of pipe adapter 17a is screwed into the rearward end of the boring bit 17, thus firmly fastening the boring bit 17 to the boring bit locator 16. In this interconnected relationship of the boring bit locator, as best seen in FIG. 4, there is a rigid connection between the boring bit locator and the bore pipe and also between the boring locator and the boring bit. Furthermore, there is a continuous communication between the internal water passageway of the bore pipe 15, adapter 15a, water passageway 34 of the locator 16, water passageway of adapter 17a, and water passageway of the boring bit 17.

Since the potting compound 57 is exposed to the earth material during boring operations, it is subject to mechanical wear, and after long experimentation it has been found advisable to incorporate silicon carbide particles 57a which are impregnated within the potting compound 57. Grit size number 30 is preferred. The transmission of radio frequency energy through the window is not impaired, and the mechanical structure is rugged and has a long useful life.

The battery cover 38 is preferably made of hardened steel.

MECHANICAL OPERATION

The present invention is typically used in installing a utility line under a street or under a railroad right-of-way. The use of water flowing through the boring bit is generally necessary in order to continuously flush the cuttings out of the bore hole. The bore is generally started from a deep hole or pit on one side of the street or right-of-way, and directed toward a deep pit on the other side. Guidance of some kind is necessary in order to insure that the remote end of the bore hole will arrive at the correct location. Guidance is also required in order to avoid having the boring bit cut into existing utility lines or other known obstacles.

During the boring operation the revolving speed of the bore pipe is usually about 20 r.p.m. Mechanical wear is a significant factor in the operation of the device, and both the sleeve 60 and the battery cover 38 may be replaced from time to time without the need for replacing or otherwise disturbing the more expensive interior portions of the device.

ELECTRICAL CIRCUIT

The electrical circuit as shown in FIG. 11 includes a relaxation oscillator, a continuous wave oscillator and an antenna, the continuous wave oscillator being periodically cut off by the operation of the relaxation oscillator.

More specifically, diode CR1 connected to the input terminal 46 is utilized to prevent connection of the battery in the wrong polarity. Capacitor C5 on the load side of the diode acts as a filter for the battery, and improves the circuit operation when the battery is getting old and its internal resistance increases. Input terminal 47 receives energy at −9 volts from the battery.

The unijunction transistor Q4 is the relaxation oscillator device, and is timed by the series combination of R5 and C4 which charge through the series combination of transistors Q2 and Q3. Resistor R6 acts as a bias resistor for the unijunction transistor Q4. The frequency of the relaxation oscillator is about 450 c.p.s., but may be 600 c.p.s. and the operation is equally satisfactory.

When transistor Q3 is conductive there is a flow of power to the continuous wave oscillator Q1, and its associated circuit then oscillates at a frequency of about 100 kc. Resistor R1 connected between base and collector is the bias resistor for Q1; the output energy from Q1 is supplied from its emitter to one connection point on the antenna coil L; and feedback energy from another connection point on the antenna coil L is coupled through a capacitor C2 to the base of Q1. Capacitor C1 is coupled in parallel with the full length of antenna coil L, and the values of these two elements are such as to provide the oscillating frequency of approximately 100 kc.

When transistor Q3 is cut off the oscillator Q1 does not receive its necessary supply of energy, and hence the oscillation ceases. The turning on and off of Q3 is not accomplished with an absolutely sharp wave envelope, but rather the ends of the envelope are somewhat rounded, and this provides a perfectly satisfactory result in the ultimate operation of the apparatus. It is significant that Q3 is turned off for a much longer period of time than it is turned on, with the result that the battery drain for operating the oscillator Q1 is greatly reduced. The time interval when Q3 is turned off is typically two or three times as great as the time interval for which it is turned on.

In the relaxation oscillator circuit resistor R3 provides a bias load for the transistors Q2, Q3. Resistor R4, connected to the ground return line of the circuit is also connected to the base of Q2, and operates in conjunction with capacitor C4 to determine the period of time for which Q3 is turned off.

In the electrical circuit typical values of the circuit elements are as follows:

| Q1 | 2N4921 | R1 | 47k. | C1 | 0.0033 µf. |
|---|---|---|---|---|---|
| Q2 | 2N3565 | R3 | 8.2k. | L | 292 turns |
| Q3 | 2N4921 | R4 | 20k. | C2 | 0.0033 µf. |
| Q4 | 2N4870 | R5 | 7.5k. | C4 | 0.15 µf. |
| CR1 | 1N4148 | R6 | 560 ohms | C5 | 4.7 µf. |

The connection points on the oscillator coil L are chosen so that there are 40 turns between the emitter of Q1 and the collector of Q3; 86 turns between the emitter of Q1 and the feedback connection of capacitor of C2; and 166 turns in the remaining part of the coil.

ELECTRICAL OPERATION

The antenna coil is not located in the exact center of the boring bit locator 16, hence as the bore pipe rotates there is a measurable rotation in the stronger side of the radiation pattern of the device. The resulting modulation of the signal received at ground surface is useful as an indication that the rotating drive is successfully being imparted to the boring bit, and at the same time does not interfere with the electrical operation of the system otherwise.

The electrical circuit is fully insulated from the metal body 20, and hence from both the bore pipe and the boring bit. The bore pipe, therefore, does not form any part of the antenna system of the device. The antenna system is provided entirely by the inductance coil L (transmitter coil 51) in conjunction with the ferrite rod 52 and the other illustrated portions of the electrical circuit.

The body 20 being made of aluminum has a magnetic permeability of one, the same as the earth and water surroundings of the device. The steel sleeve 60 and battery cover 38 do have some effect upon the radiation pattern, but this is determined in advance before the device is placed underground. The radiation pattern being measured above ground constitutes a calibration of the device. In the drawings the flux lines of the radiation pattern are indicated by broken lines 75.

For purpose of depth measurement a receiver 70 having an antenna 70a is utilized to receive the transmitted signal. Antenna 70a is tuned to the transmitter frequency, and its tuning is adjustable in case there is some change in the loading on the transmitter which alters its frequency somewhat. The antenna 70a is similar in construction to the antenna 51, 52 of the transmitter, including an elongated ferrite rod upon which an elongated helical coil is wound. While in the drawings a second receiver 72 having antenna 72a is also shown, it is not necessary to use two different receivers, but a single receiver may be used and simply placed successively in alternate positions.

The method of measuring the depth of the device is to place the receiver ahead of the device, with the longitudinal axis of the antenna coil of the receiver being aligned parallel with the longitudinal axis of the antenna coil of the transmitter. The receiver is then moved longitudinally relative to the transmitter until a null-response point is reached. Then the receiver is placed to the rear of the transmitter and the procedure repeated. The horizontal distance between the two null-response points is then measured. A chart which was previously made based on the radiation characteristic of the device then indicates the depth of the device below the surface of the ground.

While a particular type of receiver is shown, any other type of receiver with directional antenna may be used, with the antenna being aligned in a manner equivalent to that illustrated herein.

The primary significance of transmitter window 61 is that if the window were not provided, the sleeve 60 would constitute an excessive load on the antenna system, thus making it either difficult or impossible to transmit sufficient energy to the receiver.

The electrical circuit is so designed that with a significant drop in battery voltage, from the original 9 volts down to even 2 or 3 volts, there is no significant change in the transmitted frequency. Therefore, the radiation pattern is not significantly altered, and the depth calibration derived from the original radiation pattern remains accurate.

The invention has been described in considerable detail in order to comply with the patent laws by providing a full public disclosure of at least one of its forms. However, such detailed description is not intended in any way to limit the broad features or principles of the invention, or the scope of patent monopoly to be granted.

What is claimed is:

1. The method of determining the depth of a boring bit that is driven by a bore pipe for cutting a horizontal bore below ground surface, comprising the steps of:

attaching to the boring bit a battery-powered radio transmitter having a coiled antenna whose longitudinal axis is parallel to the axis of the bore pipe, and also having a known frequency and known radiation pattern;

selecting a radio receiver having a coiled antenna which is adapted to be disposed adjacent and parallel to the ground surface;

positioning the receiver in advance of the boring bit, with its antenna parallel to the transmitter antenna, and moving it longitudinally relative to the transmitter until a null signal point is reached;

positioning the receiver to the rear of the boring bit, with the two antennas parallel, and moving it longitudinally relative to the transmitter until a null signal point is reached;

and measuring the horizontal distance between the two null points;

the depth of the boring bit being then determined from said horizontal distance as a known function of the transmitter radiation pattern.

2. The method of claim 1 wherein said known transmitter frequency is about 100 kc.

3. The method of claim 1 wherein a rigid housing having a transmitter compartment therein is attached between the bore pipe and the boring bit, and the transmitter is positioned within the transmitter compartment.

References Cited

UNITED STATES PATENTS

| 1,926,327 | 9/1933 | Burrell et al. | 343—112 R |
| 2,558,977 | 7/1951 | Pearson | 324—67 X |
| 2,601,248 | 6/1952 | Brenholdt | 324—67 |

OTHER REFERENCES

Radio World, September 1936, pp. 18, 19.

BENJAMIN A. BORCHELT, Primary Examiner

R. E. BERGER, Assistant Examiner

U.S. Cl. X.R.

324—47; 343—112 D